Figure 1:
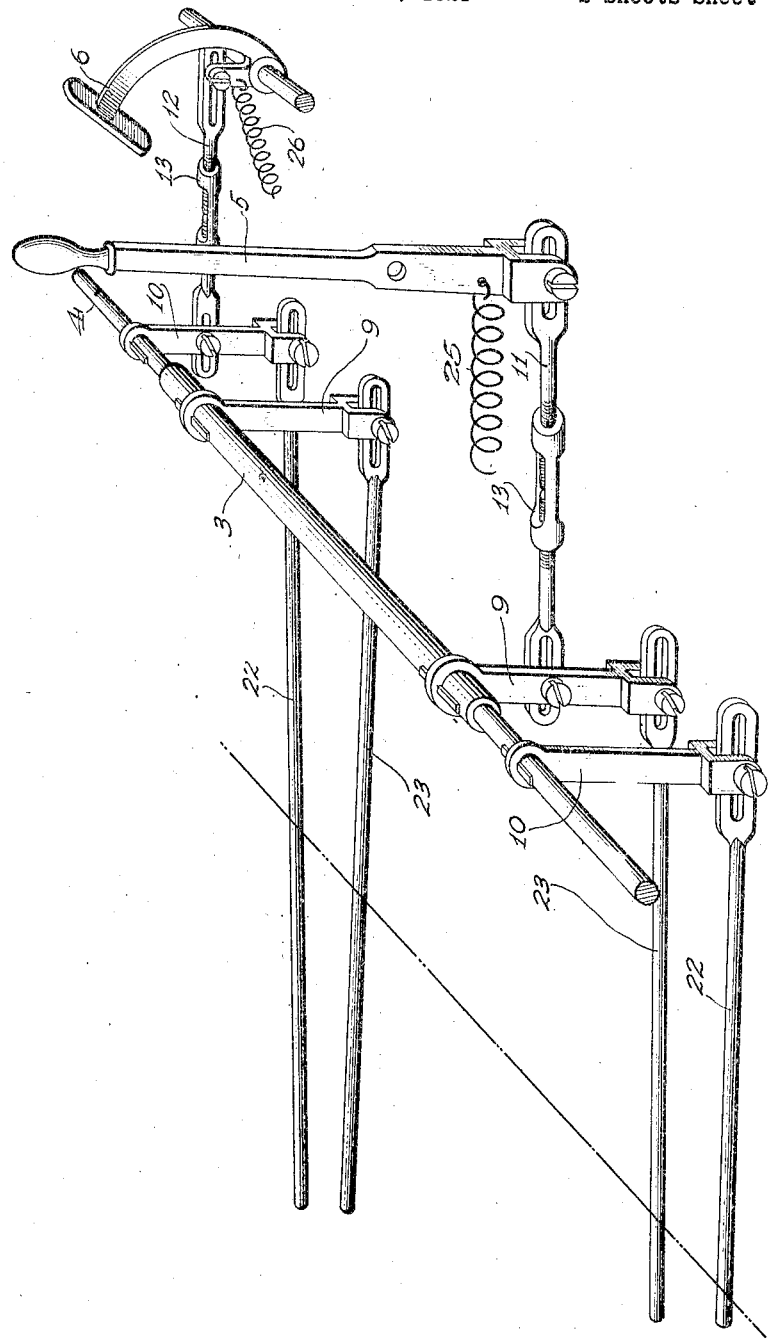

Sept. 30, 1924.

A. AMEND 1,509,919

DUPLEX BRAKE MECHANISM FOR MOTOR VEHICLES

Filed June 6, 1921  2 Sheets-Sheet 1

INVENTOR.
Arthur Amend
BY Jas H. Griffin
ATTORNEYS.

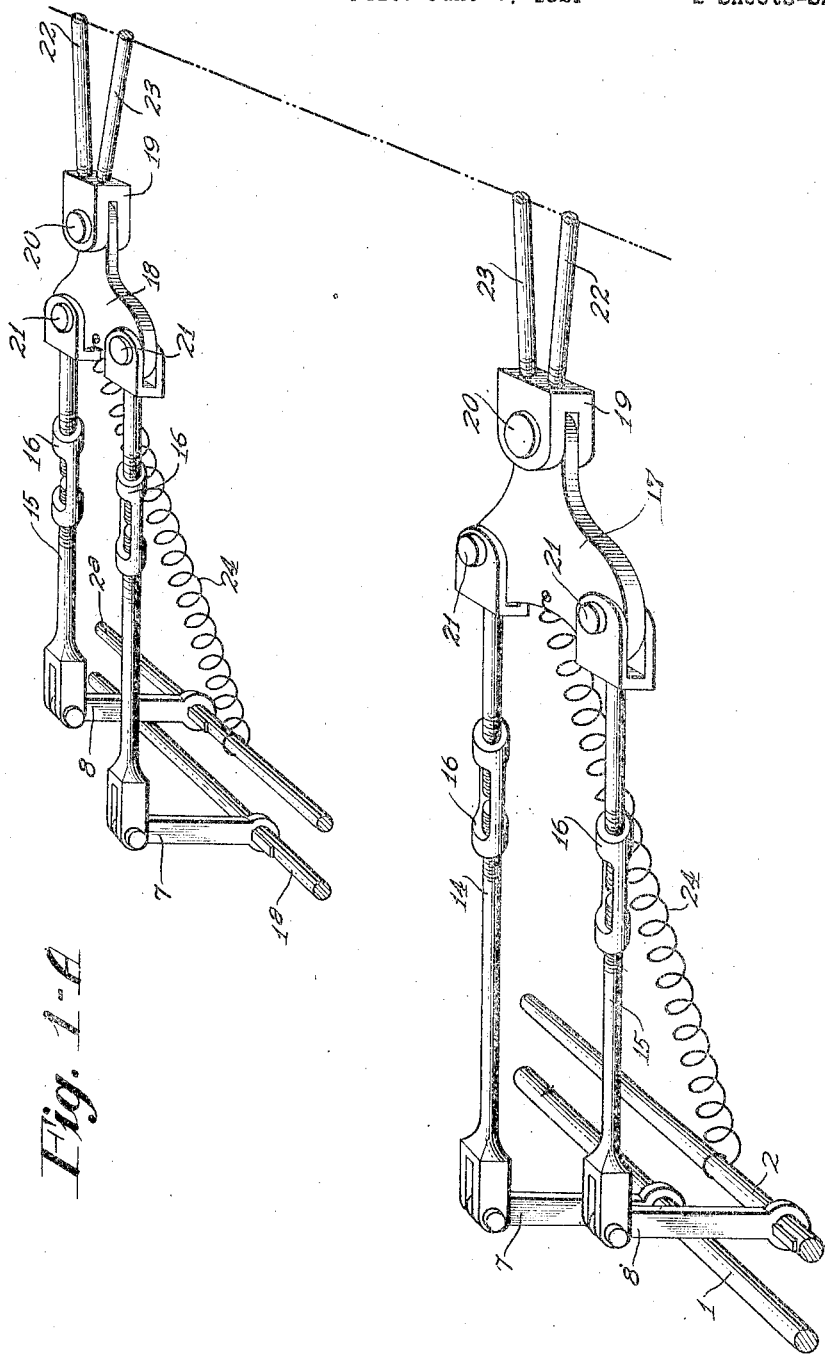

Patented Sept. 30, 1924.

1,509,919

UNITED STATES PATENT OFFICE.

ARTHUR AMEND, OF NEW YORK, N. Y.

DUPLEX BRAKE MECHANISM FOR MOTOR VEHICLES.

Application filed June 11, 1921. Serial No. 476,959.

*To all whom it may concern:*

Be it known that I, ARTHUR AMEND, a citizen of the United States, residing at New York city, borough of Manhattan, in the county and State of New York, have invented a certain new and useful Duplex Brake Mechanism for Motor Vehicles, of which the following is a specification.

This invention relates to duplex brake mechanism for motor vehicles of the character employing a dual brake control. That is to say, vehicles of the kind having a pedal operating a foot brake spindle associated with the brake drums on the rear wheels, and a hand brake or "emergency," operatively associated with a hand brake spindle, which controls braking mechanism acting upon the same drums of the rear wheels.

In vehicles of this character, as now constructed, the foot pedal operates one set of brake mechanism for braking the rear wheels, while the hand lever or "emergency" operates an entirely different set of brake mechanisms. The foot pedal is the one normally employed, but in cases of emergency the hand lever may be operated simultaneously with the foot pedal or independently thereof. In all present installations, however, the foot pedal and brake lever operate independent braking mechanisms having no connection with one another and the operation of one in nowise effects the operation of the other.

My long experience in operating and maintaining motor vehicles has shown me that in arrangements of the character described, the foot brake mechanism is subjected to much more wear than the hand brake mechanism and the former requires readjustment and replacement of worn parts from time to time in order to preserve efficiency in its operation, while the hand brake mechanism remains relatively unworn through long periods. As many drivers are careless as to the maintenance of their cars, they will continue to employ foot brake mechanism which is badly worn long after the time when it should have been repaired or the worn parts replaced, and when such a driver meets with an emergency, he finds that his foot brake will not hold and unless he is quick enough to apply the hand brake, an accident usually ensues.

With the foregoing considerations in mind, the main object of the present invention is to provide a construction wherein the wear on the foot and hand brake mechanism of the car will be equalized and accordingly the wear on either minimized. To this end, I so operatively connect the hand and foot mechanism at the rear of the car that both of such mechanisms are simultaneously operated when either the foot pedal or the hand brake lever is actuated. Through this arrangement, wear is not only equalized, but greater efficiency in braking power can be exerted through either of the operated agencies. Thus, in my construction, if the foot pedal is operated, the force exerted by the driver thereon, will be transmitted to both braking mechanisms at the rear end of the car and the same will also be true when the hand brake lever is operated independently of the foot pedal.

The novel arrangement of this invention, aside from the important advantages specified, has a further very important advantage in that if any of the brake connections become broken, such breakage, will not interfere with the proper braking of the car.

In prior constructions, the breaking of a tie rod will put the associated brake mechanism out of commission, but with the arrangement of the present invention, such is not the case.

Looking at the invention from a structural standpoint, the same contemplates the operation of each set of brake spindles on either side of the car, through a common tension member, which, because of one of its functions, may be termed an equalizer. Each equalizer is in turn secured to the rock shafts which are oscillated through operation of the foot pedal or the emergency hand brake lever.

In this manner, the foot pedal and hand brake levers are so associated with the equalizers, that both equalizers are responsive to the operations of either the foot pedal or the hand lever. Thus, if the foot pedal is operated, tension will be exerted on both equalizers and all four brake spindles will be operated to effect a braking action. In like manner, the operation of the hand lever will effect a simultaneous braking action through all four brake spindles. The equalizers are employed, so that the tension applied to the spindles will be equally divided between each set of spindles, so that the wear on the brakes will be uniform and this equalizing effect is automatic, thereby obviating the necessity of frequent adjustments. The common tension members may, in accordance with this invention, operate directly without the equalizing action referred to, but it is preferred to so construct them that they will equalize the pull for reasons manifest to those skilled in the art.

Features of the invention, other than those specified, will be apparent from the hereinafter detailed description and claims, when read in conjunction with the accompanying drawings.

The accompanying drawings illustrate one practical embodiment of the invention, but the construction therein shown, is to be understood as illustrative, only, and not as defining the limits of the invention.

Figure 1 of the drawings shows, in perspective, the forward portion of the brake mechanism of this invention; and, Figure 1ᴬ shows, in like manner, the rear portion thereof.

Referring to the drawing, 1 and 1ᵃ designate the hand brake spindles of conventional car construction, and 2 and 2ᵃ designate the foot brake spindles. As these spindles are common on many makes of cars, it has not been considered necessary to show them actually associated with the vehicle construction.

In practice, they are generally mounted on brackets, on the rear axle housing and are provided at their outboard ends with cams or links operating the brakes.

The reference characters 3 and 4 denote the usual rock shafts, which are operated by the hand lever 5 and foot pedal 6, respectively. The hand lever rock shaft 3 is usually made tubular and the foot pedal rock shaft 4 extends axially therethrough. Both of these shafts are, as a general rule, supported on the chassis of the vehicle by means of brackets, not shown.

Each hand brake spindle 1 is provided with an operating arm 7, which is keyed to the spindle and each foot brake spindle is provided with an operating arm 8 keyed to its corresponding spindle. The hand brake rock shaft 3 is provided with two operating arms 9 keyed to the rock shaft and the foot brake rock shaft is similarly provided with two operating arms 10. One of the arms 9 of the hand brake rock shaft 3 is connected through a link 11 with the lower end of the hand brake lever 5 and one of the arms 10 of the foot pedal rock shaft is connected by a link 12 to the foot pedal 6. In practice, I preferably include a turn buckle 13, in each of the links 11 and 12, so as to permit of adjustment in the length of these links, and I also connect the opposite ends of the links to a slotted connection, so as to preclude binding and permit perfect freedom of movement, irrespective of expansion and contraction.

It has been the prior practice to connect each of the operating arms 7 of the hand brake spindles 1 and 1ᵃ to one of the operating arms 9 of the hand brake rock shaft 3, and in a similar manner to connect directly by a link each operating arm 8 with one of the operating arms 10. When such construction is employed, the operation of the foot pedal will effect the operation of the brake spindles 2 and 2ᵃ, while the brake spindles 1 and 1ᵃ remain idle. Similarly when the hand brake lever is operated, with such a construction, the brake spindles 1 and 1ᵃ will function, while the spindles 2 and 2ᵃ remain idle.

In accordance with the present invention, I associate with each of the operating arms 7 and 8 short links 14 and 15, respectively, and in each link include a turn buckle by means of which the lengths of these links may be properly adjusted. The links associated with the spindles 1 and 2 are secured to a common tension member 17, while the links associated with the spindles 1ᵃ and 2ᵃ are secured to a common tension member 18.

In practice, I prefer that these common tension members shall function as equalizers and, accordingly, they are preferably made in substantially triangular form, the links 14 and 15 being pivoted at two corners of the plates and the operating arms 9 and 10 being associated with a third corner. To this end, I pivot to the third corner of each plate 17 and 18, a coupling 19 secured to the plates 17, and 18 by pivot pins 20, similar pins 21 being employed to secure the links 14 and 15 to the other two corners of each plate.

Each coupling is provided with two tapped holes, adapted for the reception of threaded ends of two rods 22 and 23. The rods 22 extend forwardly from the couplings and have a slotted connection with the ends of the operating arms 10, while the rods 23 extend forwardly and have a slotted connection with the operating arms 9. By virtue of the threaded connection between the rods 22 and 23 and the couplings 19, the operative lengths of these rods may be regulated while the slotted connections referred to give absolute freedom of movement and preclude binding.

In practice, I preferably associate with each of the equalizers 17 and 18, a spring 24, which serves to normally retract the equalizers, and oscillate the brake spindles into normally ineffective positions. A spring 25 is also associated with the link 11 to normally retract the hand brake lever and a spring 26 is associated with the foot pedal to normally retract the same.

The structural characteristics of the preferred form of the present invention having been described, the operation of the same will be set forth.

In the normal operation of the car, the foot brake pedal is used exclusively and when operated, this pedal acts through the link 12 on the operating arm 10 with which it is connected to oscillate the shaft 4, on which both of the arms 10 are keyed. Thus when the pedal 6 is depressed, tension is applied simultaneously through both of the rods 22 to both of the equalizers 17 and 18. The equalizer 17 operates to exert an equal pull simultaneously on both of the rods 14 and 15 to effect a uniform operation of the brake spindles 1 and 2, while the equalizer 18 operates in like manner upon the brake spindles 1$^a$ and 2$^a$. Thus, when the foot pedal is operated all four brake spindles 1, 1$^a$, 2 and 2$^a$ are simultaneously operated to effect a braking action on the car. The same result will occur if the hand brake lever is operated to the exclusion of the foot pedal, except that the pull of the lever will be transmitted to the equalizers through the rock shaft 3 and rods 23.

If in the normal operation of the car, when the driver is using the foot pedal, he meets with an emergency which necessitates immediate stopping of the car, he may operate both the pedal and hand level simultaneously. In which event, the aggregate force of both the hand and foot will be exerted on the equalizers and the brakes effectually "set."

It will appear from the foregoing detailed description of the invention that when the same is incorporated in car construction, the wear on the brakes will be uniform in that such wear will be equalized.

Moreover, since the driver controls all of the brakes simultaneously, he obtains the highest efficiency in braking operation, without subjecting the parts of the assembly to undue strain. Moreover, the whole arrangement is extremely flexible in that there is no binding of the parts and that the force applied by the driver is transmitted uniformly to all of the brakes.

Another important feature of the invention resides in the fact that the same may be readily associated with conventional car construction by simply substituting the tension connections shown for the usual direct connections which conventional pull rods constitute.

I am aware that the invention may be modified in details of construction without departing from the spirit thereof, and, accordingly, this invention is not to be understood as restricted to the specific showing made, but is as broadly novel as is commensurate with the appended claims.

In the majority of makes of cars now on the market, the brakes of the two rear wheels are actuated by two pairs of spindles, the spindles 1 and 2 constituting one pair and the spindles 1$^a$ and 2$^a$, constituting the other pair. The first set of spindles control the brakes of the right rear wheel, while the latter pair of spindles control the brakes of the left rear wheel. This is the usual construction. I am aware, however, that in isolated cases, the spindles 1 and 1$^a$ form a continuation of one another and constitute a single spindle and in like manner, the spindles 2 and 2$^a$ are made integral. In certain of the appended claims, the spindles are referred to as operating in pairs, but it will be understood that the constructions claimed comprehend the forming of these two pairs integrally as this is a matter of car construction and does not effect the present invention.

Having thus fully described the invention, what I claim as new and desire to secure by Letters Patent is:

1. Duplex brake mechanism for motor vehicles embodying two pairs of brake spindles for operating the brakes of the associated car; an equalizer connected with each pair of brake spindles, links for connecting each spindle of each pair to the equalizer, a braking foot pedal, a braking hand lever, a rock shaft having link connection with the foot pedal and adapted to be oscillated when the foot pedal is operated, a rock shaft having link connection with the hand lever and adapted to be oscillated when the hand lever is operated, a rigid link operatively connecting the foot lever rock shaft to each equalizer and a rigid link operatively connecting the hand lever rock shaft with each equalizer, whereby all of the brake spindles may be operated from the foot pedal without operating the hand lever and vice versa.

2. Duplex brake mechanism for motor vehicles embodying four brake spindles for braking the rear wheels of a vehicle, a foot pedal, a rock shaft adapted to be oscillated through operation of the foot pedal, a hand lever, a rock shaft adapted to be oscillated through operation of the hand lever, a pair of equalizers, rigid links for connecting each equalizer to both rock shafts, so that both equalizers will be simultaneously operated when either the foot pedal or hand lever is actuated, and means for connecting each equalizer to two of said four brake spindles.

3. Duplex brake mechanism for motor vehicles embodying four brake spindles for braking the rear wheels of a vehicle, an operating arm attached to each brake spindle, a foot pedal, a rock shaft adapted to be oscillated through operation of the foot pedal, a hand lever, a rock shaft adapted to be oscillated through operation of the hand lever, a pair of equalizers, rigid links for connecting each equalizer to both rock shafts, so that both equalizers will be simultaneously operated when either the foot pedal or hand lever is actuated, and rigid links for connecting each equalizer to the operating arms of two of said four brake spindles.

4. Duplex brake mechanism for motor vehicles embodying four brake spindles for braking the rear wheels of a vehicle, a pair of concentric rock shafts, a foot pedal for oscillating one rock shaft, a hand lever for oscillating the other rock shaft, two operating arms rigidly associated with each rock shaft, a pair of equalizers, a rigid rod extending from each equalizer to one operating arm of each rock shaft, and links for connecting each equalizer to two of said four brake spindles.

5. Duplex brake mechanism for motor vehicles embodying four brake spindles for braking the rear wheels of a vehicle, a pair of concentric rock shafts, a foot pedal for oscillating one rock shaft, a hand lever for oscillating the other rock shaft, two operating arms rigidly associated with each rock shaft, a pair of equalizers, a rigid rod extending from each equalizer to one operating arm of each rock shaft, links for connecting each equalizer to two of said four brake spindles, and a spring associated with each equalizer for normally moving the equalizers into positions to release the brakes.

6. Duplex brake mechanism for motor vehicles embodying two pairs of brake spindles, each of which pairs cooperates with one rear wheel of a vehicle, an equalizer connected to each pair of spindles, a foot pedal, a hand lever, a rock shaft associated with the foot pedal and operable thereby, a rock shaft associated with the hand lever and operable thereby, and links connecting each rock shaft with both equalizers whereby all the spindles may be operated by either the foot pedal exclusively, the hand lever exclusively or by both the foot pedal and hand lever simultaneously.

7. Duplex brake mechanism for motor vehicles embodying four brake spindles, two of which cooperate with each rear wheel of the associated vehicle, an equalizer operatively connected to the two brake spindles of each wheel, a foot pedal, a hand lever, means mounted for oscillation and operable by the foot pedal, means mounted for oscillation and operable by the hand lever, separate and independent links connecting the foot pedal oscillated means to each of the equalizers individually, and additional separate and independent links connecting the hand lever oscillated means to each of the equalizers individually, whereby all four spindles may be operated by either the foot pedal or by the hand lever or by both the foot pedal and hand lever collectively 8. Duplex brake mechanism for motor vehicles embodying four brake spindles, two of which cooperate with each rear wheel of the associated vehicle, an equalizer operatively connected to the two brake spindles of each wheel, a foot pedal, a hand lever, two separate and independent rigid links connected to each equalizer, means for operatively connecting one rigid link of each equalizer to the foot pedal, and means for operatively connecting the other rigid link of each equalizer to the hand lever, whereby all four spindles may be operated either by the foot pedal or by the hand lever or by both the foot pedal and hand lever collectively.

9. Duplex brake mechanism for motor vehicles embodying two pairs of brake spindles, each of which pairs cooperates with one rear wheel of a vehicle, an equalizer connected to each pair of spindles, a pair of rock shafts mounted to oscillate, a pair of arms on each rock shaft, two rigid links secured to each equalizer and having a pin and slot connection with one of the arms of each rock shaft, a foot pedal, a hand lever, an adjustable link connecting the foot pedal with one of the rock shafts and an adjustable link connecting the hand lever to the other rock shaft, said adjustable links having pin and slot connections with the respective rock shafts whereby the brakes may assume a neutral or non-dragging condition when the brake pedal and hand lever are in non-braking positions.

In testimony whereof I have signed the foregoing specification.

ARTHUR AMEND.